Figure 1:
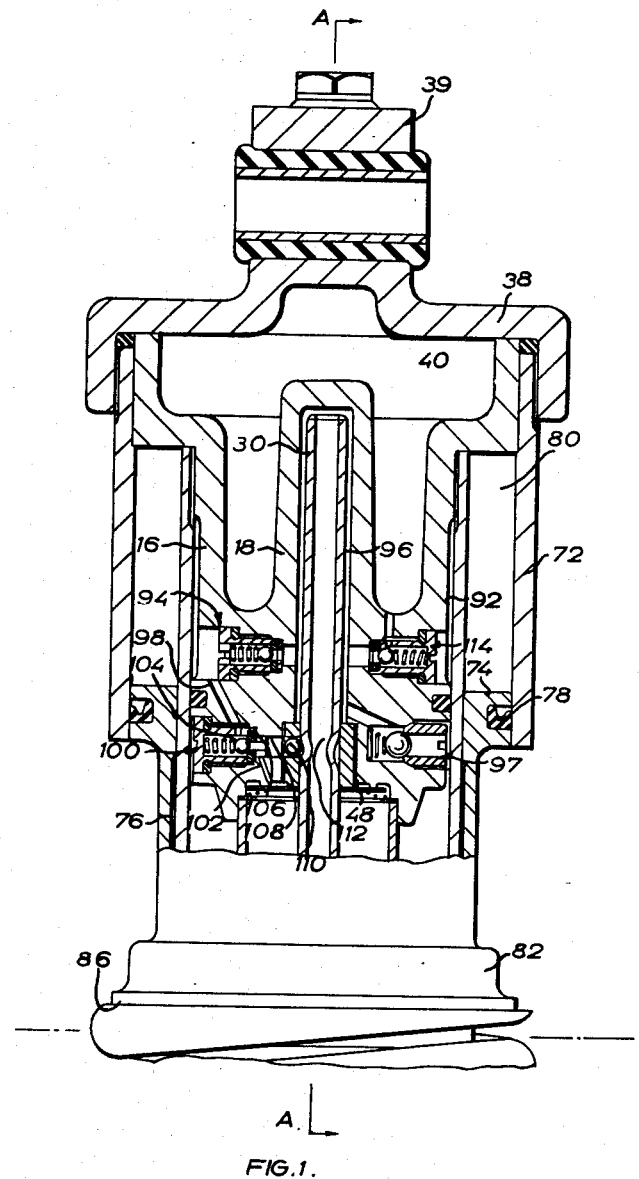

April 20, 1965  M. BARTRAM ETAL  3,179,401
VEHICLE TELESCOPIC SUSPENSION UNITS
Filed Aug. 29, 1963  9 Sheets-Sheet 1

INVENTORS:
MERVYN BARTRAM
JAMES R. KERSHAW

ATTORNEYS

April 20, 1965 M. BARTRAM ETAL 3,179,401
VEHICLE TELESCOPIC SUSPENSION UNITS
Filed Aug. 29, 1963 9 Sheets-Sheet 2

INVENTORS:
MERVYN BARTRAM
JAMES R. KERSHAW

ATTORNEYS

INVENTORS:
MERVYN BARTRAM
JAMES R. KERSHAW

United States Patent Office 3,179,401
Patented Apr. 20, 1965

3,179,401
VEHICLE TELESCOPIC SUSPENSION UNITS
Mervyn Bartram and James Richard Kershaw, York, England, assignors to Armstrong Patents Co., Limited, London, England, a British company
Filed Aug. 29, 1963, Ser. No. 305,335
3 Claims. (Cl. 267—65)

This invention concerns vehicle telescopic suspension units, and relates more particularly to such units including levelling means for maintaining a vehicle at a mean riding height irrespective of changes in the load carried by the vehicle.

The invention seeks to provide a telescopic suspension unit which is of compact and simplified construction relative to such units as hitherto available. Another object of the invention is to provide a suspension unit incorporating telescopic hydraulic shock absorbing means.

In its broadest aspect, the present invention accordingly provides a telescopic suspension unit comprising a telescopic hydraulic shock absorber having an internal low pressure chamber for hydraulic medium, a coil suspension spring coaxially surrounding said shock absorber and having one end fixed relatively to one of the telescopically engaged parts of said shock absorber, cylindrical hydraulic ram means carried by the other of said telescopically engaged parts and providing a seating for the other end of said spring, said ram means being adapted to receive a continual supply of hydraulic medium under pressure from a pressure source, and hydraulic medium release valve means between said ram means and said low pressure chamber for permitting hydraulic medium to exhaust from said ram means to said low pressure chamber whenever said telescopically engaged parts extend beyond a predetermined mean position relative to one another.

In a preferred embodiment, a telescopic suspension unit according to the present invention comprises a telescopic hydraulic shock absorber having a hydraulic medium reservoir, a piston telescopically slidable in a cylinder, an axially arranged hydraulic pump in said cylinder and co-operating with said piston for operation of said pump responsive to operation of said shock absorber, a coil suspension spring coaxially surrounding said shock absorber and having one end fixed relative to one of the telescopically engaged parts of said shock absorber, cylindrical hydraulic ram means carried by the other of said telescopically engaged parts and providing a seating for the other end of said spring, said pump being arranged continually to supply hydraulic medium under pressure to said ram means during operation of said shock absorber, and hydraulic medium release valve means between said ram means and said reservoir for permitting hydraulic medium to exhaust from said ram means to said reservoir whenever said telescopically engaged parts extend beyond a predetermined mean position relative to one another.

Conveniently, the hydraulic reservoir together with pump inlet and delivery valves may be contained in an end closure for the shock absorber cylinder, and this end closure may also provide support for a ram cylinder forming a part of the above-mentioned ram means. In addition or alternatively to the integral hydraulic reservoir, a separate reservoir may be provided at a position remote from the unit.

The invention will be described further, by way of example, with reference to the accompanying drawings, in which—

Figure 2:
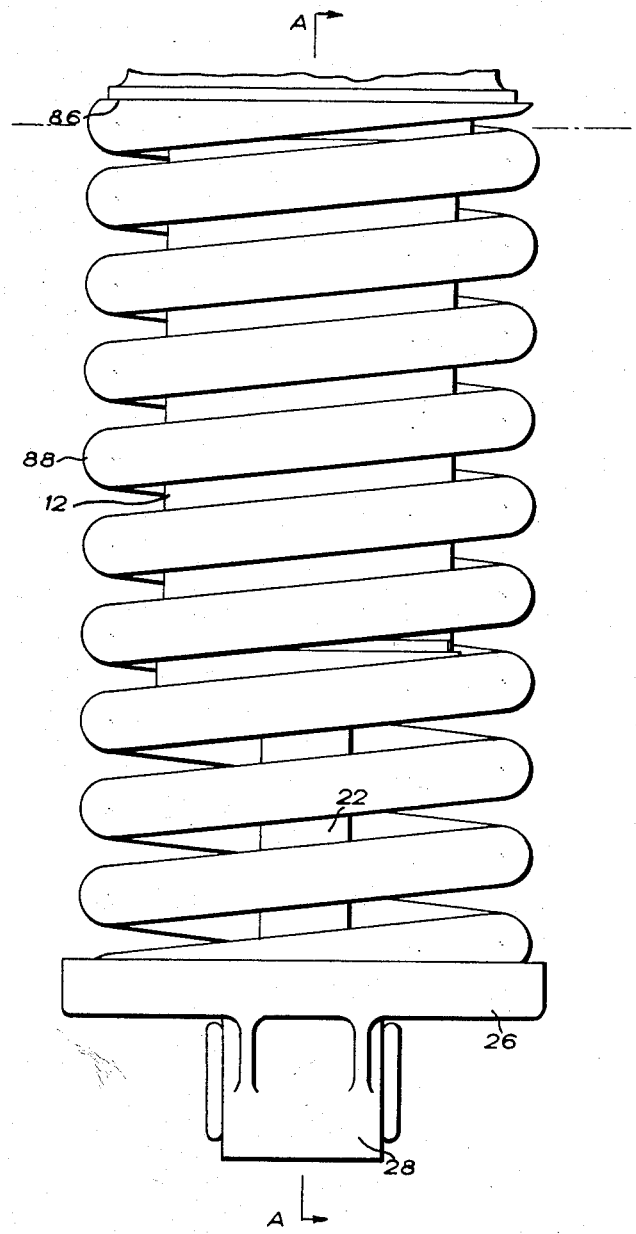
Figure 3:
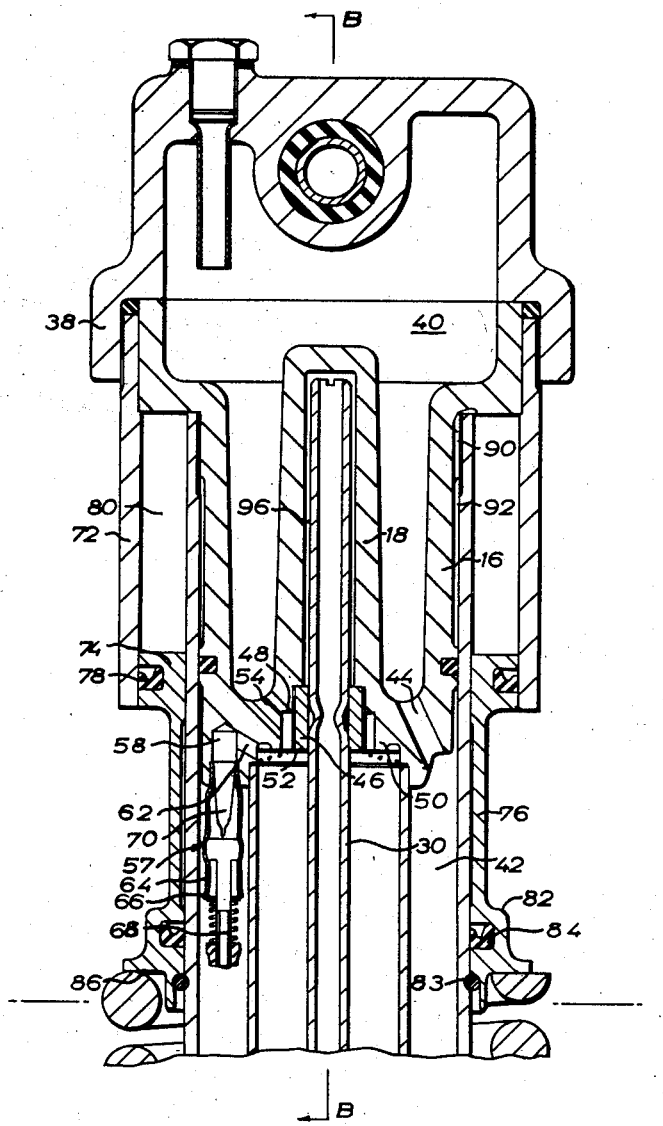
Figure 4:
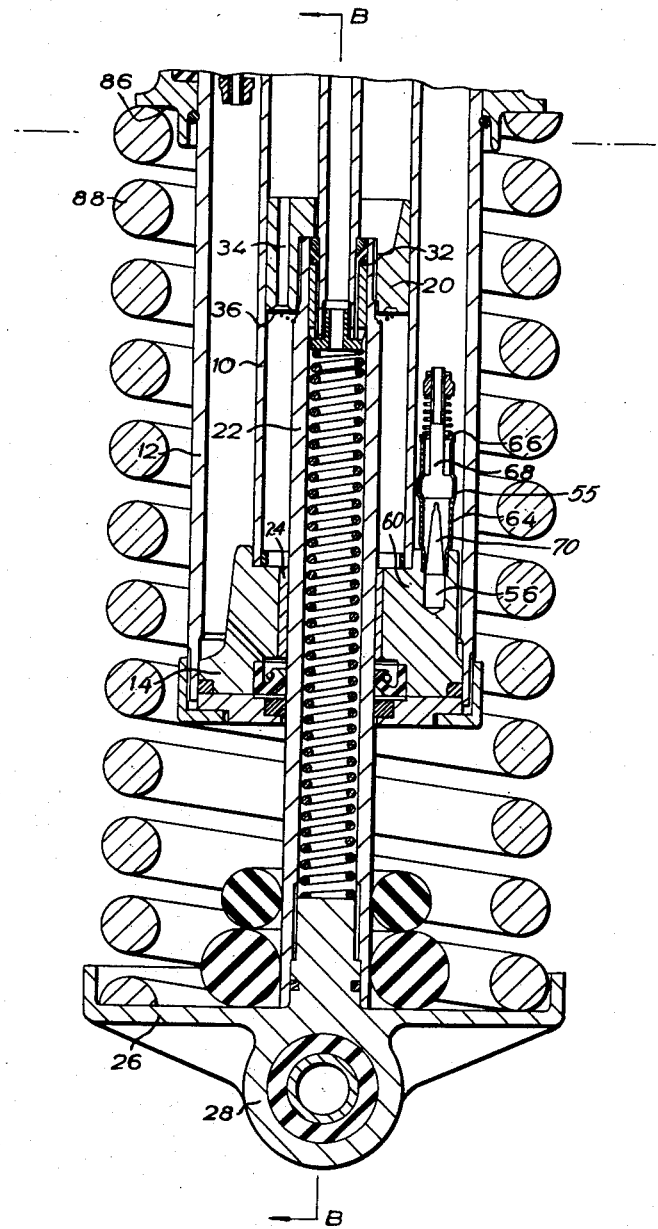
Figure 5:
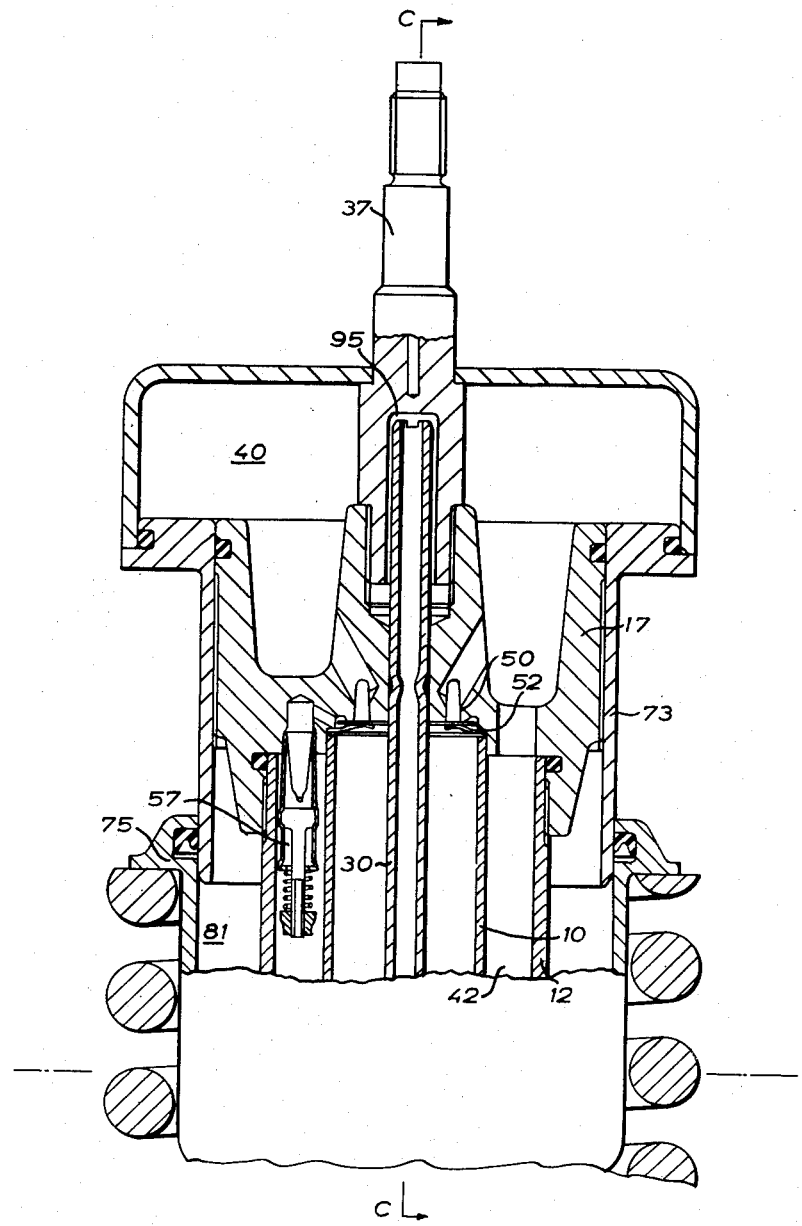
Figure 6:
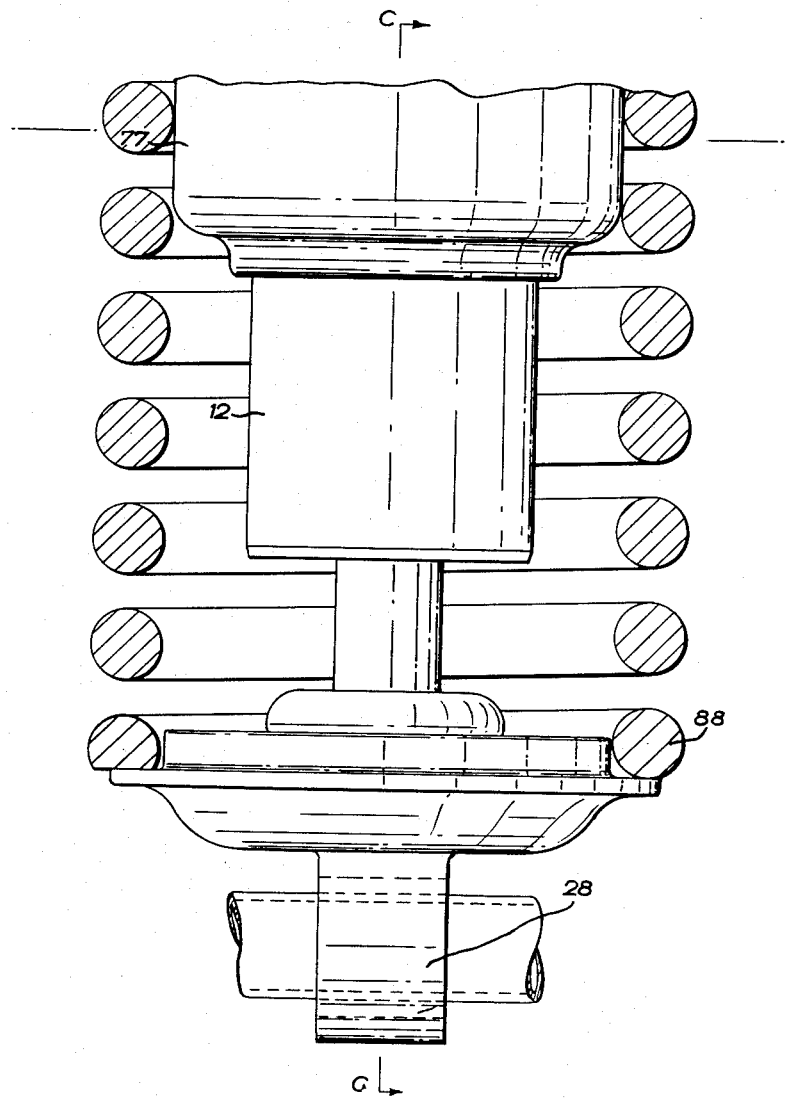
Figure 7:
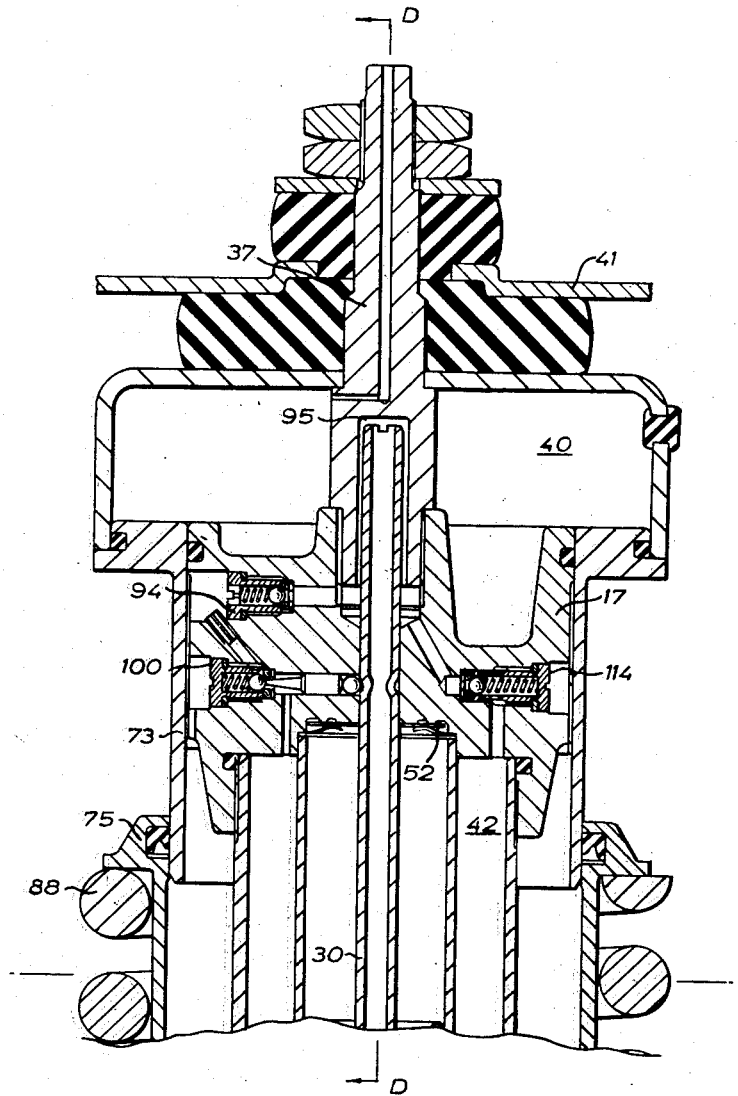
Figure 8:
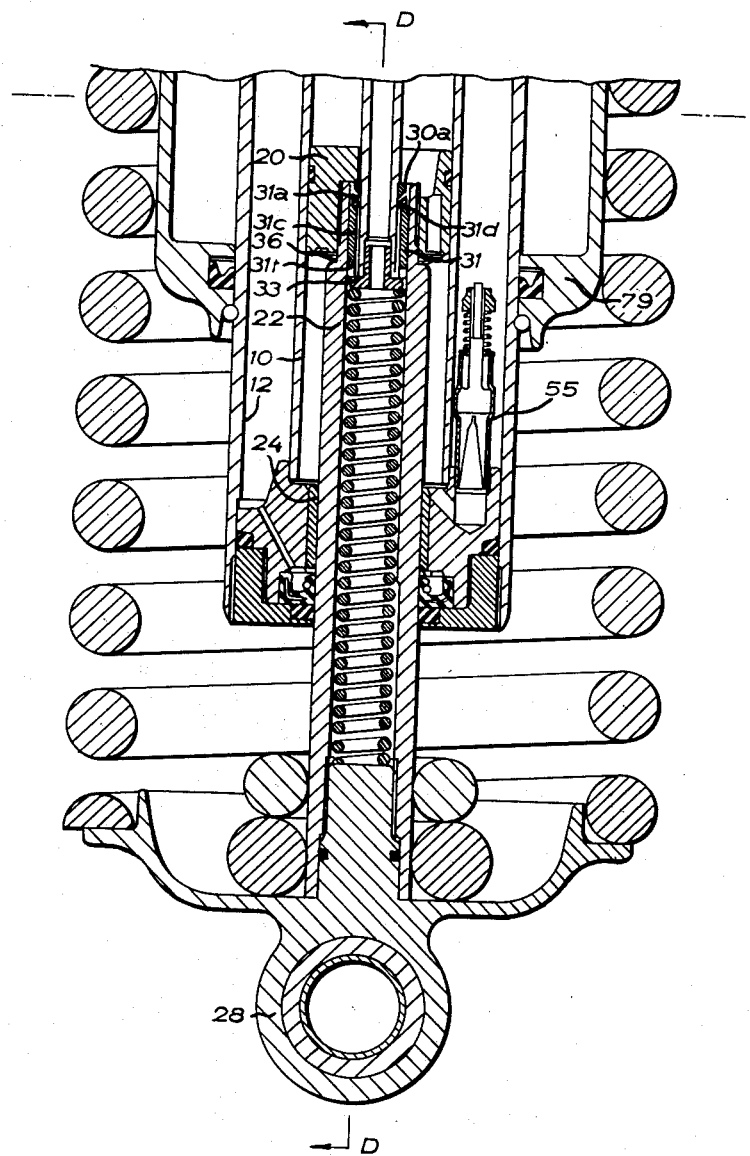
Figure 9:
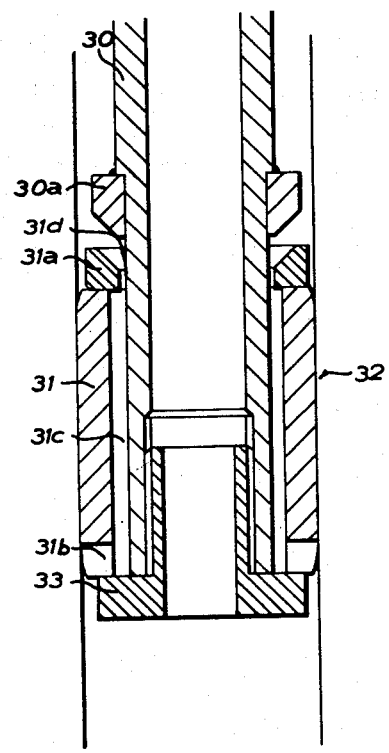

FIGS. 1 and 2 together constitute an elevation, partly in axial section on the line B—B of FIGS. 3 and 4, of a telescopic suspension unit embodying the invention;

FIGS. 3 and 4 together constitute an axial section taken on the line A—A of FIGS. 1 and 2;

FIGS. 5 and 6 together form an elevation of another embodiment of the invention, partly in axial section on the line D—D of FIGS. 7 and 8;

FIGS. 7 and 8 together form an axial section on the line C—C of FIGS. 5 and 6; and FIG. 9 is a detail of the pump piston common to both embodiments.

In the embodiment of the invention shown in FIGS. 1 to 4, a telescopic suspension unit includes a pair of coaxial cylinders 10 and 12 which at one end are closed and located relative to one another by means of a plug member 14, the other ends of the cylinders being closed by an annular cup member 16 having an axially raised dome 18. Within the inner cylinder 10 is slidably arranged a piston 20 carried at the inner end of a hollow piston rod 22 which passes through a guide bush 24 received in an axial bore of the plug member 14, and, at its outer end, the piston rod 22 has screwed to it a circular plate 26 also formed with a mounting bush 28 for connection to a convenient part of a vehicle. The piston 20 is axially bored to slidably receive a pump piston rod 30 carrying a pump piston 32 engaged within the hollow interior of the piston rod 22, the construction and operation of the pump being hereinafter more fully described, and one or more axially parallel passages 34 formed through the piston 20 is or are normally closed by a spring-loaded plate valve member 36.

The upwardly open end of the cup member 16 is closed by a cap 38, and the closed interior of member 16 constitutes a reservoir 40 for hydraulic medium, the reservoir 40 being in direct communication with the annular space 42 between the cylinders 10 and 12 by means of a passage 44 formed in the base of the cup member. A second mounting bush 39 is provided on the cap 38. The inner end of the dome 18 is fitted with a bearing 46 for the pump piston rod 30, and the bearing 46 is circumscribed by an annular chamber 48 peripherally bounded by a lip 50 depending from the base of the cup member 16 and constituting a valve seat for a further spring-loaded plate valve member 52. A further passage 54 in the base of the cup member 16 places the chamber 48 in communication with the reservoir 40.

Within the annular space 42 are arranged a pair of damping valves 55 and 57 extending from blind bores 56 and 58 respectively formed in the plug member 14 and the cup member 16. The blind bore 56 communicates with the interior of cylinder 10 behind the piston 20 by means of a passage 60, and the blind bore 58 communicates with the cylinder space in front of the piston 20 by means of a passage 62. Each damping valve comprises a tube 64 having one end fitted in its associated blind bore 56 or 58, the other end of tube 64 acting as a valve seat, and a plate valve member 66 guided on a threaded spindle 68 held in and projecting from the tube 64, the valve member 66 being adjustably spring-loaded on to its seat. Each valve includes a hydraulic medium filter 70.

The components thus far described of the suspension unit shown in FIGS. 1 to 4 constitute a telescopic hydraulic shock absorber which when the unit is mounted between two relatively sprung parts of a vehicle, serves to damp relative motion between such parts. Thus, when the vehicle is travelling along a normal road surface having only slight irregularities therein, the resulting small movements of the piston 20 in the cylinder 10 set up only correspondingly small displacements of hydraulic medium, which take place through the piston itself from the cylinder space in front to the cylinder space behind the piston when the latter moves further into the cylinder 10, and from the reservoir 40 through passage 54 and chamber 48 to the cylinder space in front of the piston when the latter moves in the opposite direction. These small piston and hydraulic medium movements are permitted by leak notches or apertures (not shown) provided in the plate valve members 36 and 52 or in the valve members 66. Larger movements of the piston 20, occasioned by more pronounced road surface irregularities and which cannot be accommodated by the leak notches as permitted by the damping valves 55 and 57 in the annular space 42. For example, if the vehicle should encounter a bump in the road surface, the piston 20 is moved abruptly further into the cylinder 10, the resulting increase in pressure in the cylinder space in front of the piston holding the plate valve member 52 firmly on its seat 50, and at the same time lifting the valve member 36 from its seat. Fluid flow paths for hydraulic medium then exist through the bore 34 in the piston 20 to the cylinder space behind the piston, and through the damping valve 57 via passage 62 and blind bore 58 into the annular space 42, the rate of piston movement, that is to say, the damping exerted by the unit in the bump direction, being controlled by the setting of the damping valve 57, as determined by the spring force urging the valve member 66 towards its seat. In the reverse circumstances, that is to say, during a rebound stroke of the unit following a bump or compression stroke as discussed above, the piston 20 is abruptly moved in a direction outwardly of the cylinder 10, and the resulting increase in pressure in the cylinder space behind the piston holds the plate valve member 36 on its seat, hydraulic medium displaced from that cylinder space being discharged into the annular space 42 through the passage 60 and damping valve 55 at a rate determined by the setting of the valve 55. Due to the corresponding drop in hydraulic pressure in the cylinder space in front of the piston 20, the plate valve member 52 lifts from its seat and enables additional hydraulic medium to recuperate into the cylinder from the reservoir 40, through the passage 54 and annular chamber 48.

Between the cap 38 and the cup member 16 is clamped a downwardly directed ram cylinder 72 within which is slidable a ram 74 having a skirt 76 engaged on the outer cylinder 12. The ram 74 is peripherally recessed to receive a hydraulic seal 78 closing the lower end of the ram chamber 80 defined between the ram cylinder 72 and the outer cylinder 12, and the lower end of the skirt 76 is formed with an annular flange portion 82 which is peripherally recessed to receive a second main hydraulic seal 84 for the ram chamber 80 and which also presents a seat 86 for a coil suspension spring 88, the other end of which seats on the circular plate 26. The lower limit of movement of the ram 74 is determined by a circular spring clip 83 engaged around the outer cylinder 12. Thus, if a load is applied to the mounting bushes 28 and 39 of the suspension unit, and the ram chamber 80 is maintained filled with hydraulic medium, such load will be transmitted by the ram 74 to the spring 88, and it will be appreciated that the extent of compression of the spring 88 is controllable by controlling the pressure of the hydraulic medium in the ram chamber 80.

For this purpose, the ram chamber 80 communicates, by way of a groove 90 in the upper end of cylinder 12, an annular clearance 92 between the cylinder 12 and the cup member 16 and a pump delivery valve 94 arranged in the latter, with a pump chamber 96 defined between the upper end of the pump piston rod 30 and the interior of the dome 18. At the same time, a passage 98 formed in the cup member 16 between the delivery side of the valve 94 and a release valve 100 enables the ram chamber 80 to connect, under the control of the release valve 100, with the reservoir 40 through an exhaust port 102 arranged between the chamber 48 and the downstream side of the release valve. The release valve itself comprises a ball valve member 104 spring-loaded on to a valve seat 106 through which passes a push rod 108 having one end engaging the valve ball 104. The opposite end of the push rod 108 bears against a ball 110 slidably located in an aperture in the pump piston rod bearing 46 so as normally to be received in a depression 112 of the pump piston rod 30.

In the operation of the suspension unit proposed by the invention, the continual reciprocation of the shock absorber piston 20 and of the pump piston 32 set up as the vehicle traverses a road surface causes hydraulic medium to be supplied under pressure to the ram chamber 80 from the annular space 42 through the pump inlet valve 97 to the pump chamber 96, and through the pump delivery valve 94. Induction strokes of the pump take place as the two relatively movable parts of the unit respectively terminating in the mounting bushes 28 and 39 move away from one another, that is to say, in the rebound direction. In the extreme case, following a bump or compression stroke of the unit which has brought the piston 20 to its maximum inward position within the inner cylinder 10, with the pump piston rod 30 fully engaged within and restrained from further movement by the dome 18, subsequent extension of the unit in the rebound direction initially causes the piston 20 to move outwards in its cylinder 10 and along the pump piston rod 30, during which time the volume of hydraulic medium drawn into the pump chamber 96 is proportional to the bore of the piston rod 22, and thereafter further outward movement of the piston 20 causes it to engage the pump piston 32, withdrawing the pump piston rod 30 from the dome 18 and causing a further volume of hydraulic medium proportional to the metal sectional area of pump piston rod 30 to be drawn into the pump chamber 96. A delivery stroke of the pump then takes place during the following recovery of the suspension unit in the bump direction, when the hydraulic medium in the pump chamber 96 is delivered through the pump delivery valve 94 to the ram chamber 80. In the first part of this delivery stroke, since the pump piston 32 is maintained in contact with the shock absorber piston 20 by spring pressure and also due to the differential areas of the pump piston 32 and its piston rod 30, the latter is displaced into the dome 18 and a volume of hydraulic medium proportional to the metal sectional area of the pump piston rod 30 is delivered to the ram chamber 80, while in the second part of the delivery stroke, with the pump piston rod again restrained from further movement by the dome 18, the piston 20 continues its inward movement in the cylinder 10 to deliver to the ram chamber 80 a volume of hydraulic medium proportional to the bore of the shock absorber piston rod 22.

Under normal riding conditions, however, extremes of movement such as those described immediately above are not usually encountered, and the relatively small road surface irregularities more generally encountered will produce correspondingly small oscillations of the shock absorber piston 20 about a mean position in its cylinder 10, with equivalent deliveries of hydraulic medium by the pump to the ram chamber. This mean position of the piston 20 depends upon the average position with respect to one another of the two relatively movable parts of the suspension unit, which in turn is determined by the various parameters of the suspension system in which the unit is incorporated and represents the optimum median riding height for the vehicle. The hydraulic release valve 100 provided in the illustrated suspension unit co-operates with the pump to maintain this median riding height. Thus, while the load carried by the vehicle remains constant, the pump piston rod 30 remains substantially in its innermost position within the interior of the dome 18, as shown in FIGS. 1 and 3, the ball 110 remains seated in the depression 112 of the rod 30, and the release valve member 104 remains closed under spring pressure against its seat 106. Due to the continual delivery of hydraulic medium to the ram chamber 80, however, the ram 74 is caused to compress the spring 88, thus slightly separating the two relatively movable parts of the suspension unit and raising the vehicle. The resulting small outward movement of the pump piston rod 30 in the dome 18 then causes the ball 110 to ride up the inclined surface of the depression 112, axially displacing the push rod 108 and unseating the release valve member 104 to allow hydraulic medium to exhaust from the ram chamber until such time as consequent contraction of the suspension unit back to its median riding height restores the ball 110 back into the depression 112 and closes the release valve. In this way, continual pumping of hydraulic medium into the ram chamber 80, allied to intermittent fractional release of hydraulic medium from that chamber maintains the unit at its mean riding height. It will be appreciated that a similar action takes place should the load carried by the vehicle decrease, an extension of the unit resulting from the reduced load unseating the release valve member 104 in the same way and allowing hydraulic medium to exhaust from the ram chamber 80 until the ball 110 is once again located in the depression 112. Conversely, should the load on the vehicle increase, causing the ram cylinder 72 to slide relative to the ram 74 so as to reduce the volume of the ram chamber 80, further operation of the release valve 109 will be delayed until the pump has increased the hydraulic pressure in chamber 80 to a new value at which the ram is restored to its former position in cylinder 72, compressing the spring 88 and once again raising the vehicle to its mean riding height.

Conveniently, an overload relief valve 114 is arranged between the pump chamber 96 and the reservoir 40 to prevent excessive hydraulic pressures from being developed in the pump chamber, and, if desired, a compression spring is provided in the interior of the shock absorber piston rod 22 to maintain positive engagement between the shock absorber piston 20 and the pump piston 32.

The modified embodiment of the invention shown in FIGS. 5 to 8 differs from the embodiment previously described primarily in the use of a hollow ram construction to replace the ram 74 and skirt 76 of FIGS. 1 to 4, thereby achieving a suspension unit of somewhat compacter length. The pump piston assembly itself is also adapted, in FIGS. 5 to 8, to serve as the pump inlet valve.

Referring more particularly to the latter four figures, it will be observed that except in minor details which are not directly relevant to the invention, the telescopic shock absorber construction and operation is as already described. The cup member 17 closing the ends of cylinders 10 and 12 is somewhat shallower, and over a major portion of its length is engaged by a ram cylinder 73 which extends only a short distance below the cup member. The ram cylinder 73 is externally engaged by a ram 75 having a cylindrical skirt 77 coaxially spaced around the outer cylinder 12 to define a ram chamber 81 closed at its lower end by an annular flange 79 of the skirt 77. The spring 88 seats beneath the ram 75 itself.

In this embodiment of the invention, the pump chamber 95 will be seen to be defined within a fixing stud 37 for securing the unit to a vehicle frame indicated at 41, as an alternative to the mounting bush 39 of FIGS. 1 to 4.

Referring to the detail of FIG. 9, common to both embodiments, the pump piston 32 comprises a bush 31 slidable on the inner end of the pump piston rod between limits defined by an end nut 33 and an annular valve closure member 30a carried by the pump piston rod. The end of the slidable bush facing the valve member 30a is formed as an annular valve seat 31a, and at its opposite end the bush is formed with radial grooves 31b communicating with an annular clearance 31c between the bush 31 and the piston rod 30 and an annular clearance 31d between the latter and the valve seat 31a. Thus, during induction strokes of the pump, when the pressure within the pump chamber 95, pump piston rod 30 and shock absorber piston rod 22 falls, the bush 31 will be held under gravity and by the reduced pressure against the nut 33, with the valve 30a, 31a open. Hydraulic medium can then pass from the cylinder space 10 in front of the piston 20, through the clearances 31d, 31c and grooves 31b into the interior of the piston rod 22, the damper recuperation valve 52 opening, if necessary, to allow replenishment of hydraulic medium in cylinder 10 from the reservoir 40. On the subsequent delivery stroke the increase in pressure within piston rod 22 urges the bush 31 toward the closure member 30a to close the valve 30a, 31a and permit delivery of hydraulic medium from the pump chamber 95, through the delivery valve 94 and into the ram chamber 81. The valve 30a, 31a thus constitutes a pump inlet valve, and is complementary to the valve 97 of FIGS. 1 to 4. An auxiliary pump inlet valve corresponding to the valve 97 may be provided in FIGS. 5 to 8, if desired.

In all other respects, the construction and operation of embodiment of FIGS. 5 to 8 is identical with that of FIGS. 1 to 4, except in minor details which are not relevant to the invention.

Although in both the embodiments of the invention described above, the suspension unit is shown as incorporating its own internal hydraulic pump, it will be appreciated that, if more convenient, the pump may be situated independently of the suspension unit itself the latter then constituting a damping, springing and levelling unit which is supplied with pressurized hydraulic medium from an external source. In such a case, a number of suspension units may be supplied with pressurized hydraulic medium from a single common source such as a pump or a pressure accumulator.

We claim:

1. A telescopic hydraulic suspension unit comprising a telescopic hydraulic shock absorber including a cylinder with a piston telescopically engaged in said cylinder, damping valve means for governing the maximum rate of displacement of said piston in said cylinder, and end closure member closing one end of said cylinder and at least in part defining a hydraulic reservoir for said shock absorber, an outer cylinder coaxially surrounding the first cylinder and also closed at one end by said end closure member, and a plug member engaging in and closing the other ends of said two cylinders and locating said other ends relative to one another, the annular space between said two cylinders constituting a hydraulic chamber in direct communication with said reservoir and containing said damping valve means; a coil suspension spring coaxially surrounding said shock absorber and having one end fixed relatively to one of the telescopically engaging parts of the shock absorber; a ram cylinder depending from said end closure member in spaced relation around said outer cylinder; a hydraulic ram in said ram cylinder and located in the annular space between said ram cylinder and said outer cylinder; an annular skirt depending from said ram and engaged upon the shock absorber outer cylinder, said ram and skirt providing a seating for the other end of said suspension spring; axially arranged hydraulic pump means in said first cylinder and co-operating with said piston for operation of said pump means, contingent upon piston movement, to continually supply hydraulic medium under pressure from said reservoir and hydraulic chamber to said ram cylinder; and hydraulic medium release valve means in said end closure member for passing hydraulic medium from said ram cylinder to said reservoir and chamber whenever said telescopically engaged parts extend beyond a predetermined mean position relative to one another.

2. A telescopic hydraulic suspension unit comprising a telescopic hydraulic shock absorber including a cylinder with a piston telescopically engaged in said cylinder, damping valve means for governing the maximum rate of displacement of said piston in said cylinder, an end closure member closing one end of said cylinder and at least in part defining a hydraulic reservoir for said shock absorber, an outer cylinder coaxially surrounding the first cylinder and also closed at one end by said end closure member, and a plug member engaging in and closing the other ends of said two cylinders and locating said other ends relative to one another, the annular space between said two cylinders constituting a hydraulic chamber in direct communication with said reservoir and containing said damping valve means; a coil suspension spring coaxially surrounding said shock absorber and having one end fixed relatively to one of the telescopically engaged parts of the shock absorber; a ram cylinder depending from said end closure member in spaced relation around said outer cylinder; a cylindrical hydraulic ram having one end engaged in hydraulically sealed relation externally over said ram cylinder and its other end similarly engaged over the shock absorber outer cylinder, said ram, ram cylinder and outer cylinder co-operating to define a ram chamber and said ram providing a seating for the other end of said coil suspension spring; axially arranged hydraulic pump means in said first cylinder and co-operating with said piston for operation of said pump means, contingent upon piston movement, to continually supply hydraulic medium under pressure from said reservoir and hydraulic chamber to said ram chamber; and hydraulic medium release valve means in said end closure member, for passing hydraulic medium from said ram chamber to said reservoir and hydraulic chamber whenever said telescopically engaged parts extend beyond a predetermined mean position relative to one another.

3. A telescopic hydraulic suspension unit comprising a telescopic hydraulic shock absorber including a cylinder with a piston telescopically engaged in said cylinder, damping valve means for governing the maximum rate of displacement of said piston in said cylinder, an end closure member closing one end of said cylinder and at least in part defining a hydraulic reservoir for said shock absorber, an outer cylinder coaxially surrounding the first cylinder and also closed at one end by said end closure member, and a plug member engaging in and closing the other ends of said two cylinders and locating said other ends relative to one another, the annular space between said two cylinders constituting a hydraulic chamber in direct communication with said reservoir and containing said damping valve means; a coil suspension spring coaxially surrounding said shock absorber and having one end fixed relatively to one of the telescopically engaged parts of the shock absorber; cylindrical hydraulic ram means depending from said end closure member in spaced relation around the shock absorber outer cylinder; a hollow piston rod extending axially of the shock absorber cylinders to project from the ends thereof remote from said end closure member, said shock absorber piston being axially bored and carried at the inner end of said piston rod; hydraulic pump means comprising a hollow pump piston rod passing at one end through said shock absorber piston into the shock absorber piston rod and extending axially in said first cylinder towards said end closure member, said end closure member being formed with a centrally situated pump chamber receiving the other end of said pump piston rod, and valve controlled passage means between said hydraulic chamber and said ram means and including the interiors of said two piston rods for continually supplying hydraulic medium under pressure from said chamber to said ram means upon operation of said pump means responsive to relative displacement between said two piston rods; and a release passage including a push-rod operated, hydraulic medium release valve between said ram means and said reservoir and comprising a release valve closure member normally sealing said release passage and push rod means bearing at one end against said release valve closure member and at its other end against the pump piston rod, said pump piston rod being formed with a depression for receiving said other end of said push rod means whenever said release valve is closed, and displacement of said push rod means being effective to unseal said release valve closure means whenever said pump piston rod moves outwardly of said pump chamber consequent upon extension of said suspension unit.

References Cited by the Examiner
UNITED STATES PATENTS

| 2,592,391 | 4/52 | Butterfield. | |
| 2,650,108 | 8/53 | Bruce | 267—34 X |
| 2,802,664 | 8/57 | Jackson | 267—64 |
| 2,809,051 | 10/57 | Jackson | 267—34 |
| 2,942,873 | 6/60 | Wordsworth | 267—15 |
| 2,980,418 | 4/61 | Doetsch | 267—64 |
| 3,033,556 | 5/62 | Wossner. | |
| 3,076,643 | 2/63 | Bittel. | |
| 3,128,088 | 4/64 | Paschakarnis. | |

FOREIGN PATENTS

| 536,263 | 5/41 | Great Britain. |
| 870,037 | 6/61 | Great Britain. |

ARTHUR L. LA POINT, *Primary Examiner.*